United States Patent Office 3,009,905
Patented Nov. 21, 1961

3,009,905
PRODUCTION OF POLYMERS
John William Croom Crawford, Welwyn Garden City, and Dennis Geoffrey Murray Wood, Bognor Regis, England, assignors to Imperial Chemical Industries Limited, Millbank, London, England, a corporation of Great Britain
No Drawing. Filed May 21, 1957, Ser. No. 660,438
Claims priority, application Great Britain June 11, 1956
11 Claims. (Cl. 260—93.5)

This invention relates to an improved method for the production of polymers.

The object of the present invention is to provide a method for obtaining good yields of crystalline polystyrene or of copolymers of styrene with other olefines.

According to the present invention we provide a process in which styrene, mixed if desired with another olefinic monomer, having a soluble copper compound dissolved therein, is polymerized by contact with a medium containing a material formed by reacting a hydrocarbon compound of aluminum, gallium, indium, thallium or lead with a tetravalent vanadium compound, the said vanadium compound being reacted with said hydrocarbon compound in a molar ratio which is less than 1.2:1. The copper compound may, if desired, be dissolved in the styrene monomer at the same time as the latter is brought into contact with the said medium, e.g. by mixing the styrene monomer with a solution of the copper compound dissolved in an inert solvent.

A suitable medium is a hydrocarbon liquid preferably comprising at least one liquid aliphatic, including cycloaliphatic, hydrocarbon since the reaction of this invention is carried out most satisfactorily when such a medium is used. Oxygen and water should not be present in this medium or only allowed access to it in very small or controlled amounts as they react vigorously with said material. For best results by the process of this invention said hydrocarbon liquid should only be present in limited amounts, i.e. not more than four volumes, and preferably at least two volumes, of hydrocarbon liquid per volume of liquid monomer. These quantities of hydrocarbon liquid assist appreciably the removal of the heat of reaction and therefore the control of the reaction temperature. As polymer is formed during the reaction more hydrocarbon liquid may be added to maintain the reaction mixture in a mobile state. We prefer to use as the said hydrocarbon liquid at least one relatively high boiling aliphatic hydrocarbon, for example boiling between 80 and 140° C.

Of the said hydrocarbon compounds the aluminum trialkyls are preferred, because of their reactivity and relative ease of preparation, particularly the lower aluminum trialkyls such as aluminum triethyl, for economy. Methylcyclohexane is a very suitable hydrocarbon liquid for use in conjunction with aluminum triethyl.

The vanadium compounds best suited for our process are the vanadium tetrahalides, vanadium tetrachloride being preferred because of its availability and solubility in hydrocarbon solvents. This invention is most effective when the molar ratio of liquid monomer to vanadium is less than 50:1.

Suitable copper compounds are copper naphthenate, copper propionylacetonate and copper hexoylacetonate.

Said medium with its contents is very satisfactorily prepared by stirring together a solution of said hydrocarbon compound with a solution of said vanadium compound. The reaction of this invention is then conducted by stirring the medium and its contents with the liquid monomer which contains said copper compound dissolved therein. Very effective results are obtained when the amount of copper provides at least 0.5% copper by weight of the weight of vanadium compound used. Further hydrocarbon liquid may be added to the reaction mixture, if desired, during the polymerization in order to maintain mobility in the mixture. Reaction temperatures may be varied widely; temperatures differing as much as —30° C. and 70° C. are suitable. 40° C. is a particularly satisfactory reaction temperature. Pressure may be applied to the polymerization mixture, if desired.

As the contents of said medium are normally deeply colored and highly reactive, it is necessary to decompose them and usually to extract the decomposition products from the polymer produced. This decomposition is effected satisfactorily by treating the polymer or copolymer with a hydroxyl containing compound, e.g. water or steam, with the addition if desired of further hydrocarbon liquid should an increase in the mobility of the mixture be required. The decomposition products may then be washed from the polymer with an alcohol, for example methanol, containing mineral acids if desired.

Styrene may be copolymerized according to the present invention with such other olefines as ethylene, propylene, butene-1 and butene-2, vinyl toluene, vinyl naphthalene, allyl benzene, 1-vinyl cyclohex-3-ene, butadiene and isoprene.

The following examples serve to illustrate our invention. It is, however, to be understood that our invention is in no way limited by these examples.

*Example 1*

A solution of aluminum triethyl (1.88 g., 0.0165 mol.) in methylcyclohexane (16 ml.) was added during nine minutes to a solution of vanadium tetrachloride (2.869 g. 0.0149 mol.) in light petroleum (B.P. 60–80° C., sodium dried, 34 ml.) with stirring in an atmosphere of nitrogen. The temperature was kept at 15° C. by cooling. After five minutes, styrene (15.4 g., 0.148 mol.) containing cupric naphthenate (0.282 g. having a 10% by weight Cu content) in solution was added with stirring over eleven minutes at 15° C. At this stage the reaction mixture had become almost solid. Stirring was, however, continued for two hours. The catalyst was then decomposed by adding methanol (100 ml.) and the mixture was filtered. The dirty blue precipitate was washed once with methanol (100 ml.) containing dilute (5 N) nitric acid (10 ml.), then four times with methanol alone, sucked dry and extracted continuously with ether for five hours. Crystalline polystyrene (6.6 g., 43% based on monomer) remained insoluble and was in the form of a white powder. Amorphous polystyrene (1.4 g., 9.1%) was recovered from the ether-extract and the reaction liquors.

*Example 2*

The procedure of Example 1 was reproduced exactly using aluminum triethyl (3.61 g., 0.0316 mol.) dissolved in methylcyclohexane (32 ml.), vanadium tetrachloride (5.477 g., 0.0284 mol.) dissolved in light petroleum (as before, 66 ml.) and styrene (29.6 g., 0.284 mol.) containing cupric hexoylacetonate (0.578 g.). The weight of crystalline polymer obtained was 11.2 g., 38% based on monomer. The weight of amorphous polymer was 2.6 g., 9% based on monomer.

*Example 3*

The procedure of Example 1 was reproduced exactly using aluminum triethyl (2.36 g., 0.0207 mol.) dissolved in methylcyclohexane (21 ml.), vanadium tetrachloride (3.599 g., 0.0186 mol.), dissolved in light petroleum (as before, 43 ml.) and styrene (19.4 g., 0.186 mol.) containing cupric propionylacetonate (0.229 g.). The weight of crystalline polymer obtained was 8.3 g., 43% based on monomer. The weight of amorphous polymer was 1.2 g., 6% based on monomer.

We claim:
1. A process for the production of crystalline styrene polymers which comprises polymerising styrene having dissolved therein a soluble copper compound selected from the class consisting of copper naphthenate, copper propionylacetonate and copper hexoylacetonate, by bringing said styrene into contact with a liquid aliphatic hydrocarbon medium containing the reaction product of an aluminum lower alkyl with vanadium tetrachloride, said vanadium tetrachloride being reacted with said aluminum alkyl in a molar ratio which is less than 1.2:1.

2. A process according to claim 1 in which the aluminum trialkyl is aluminum triethyl.

3. A process according to claim 1 in which catalytic material in the polymer is decomposed, further hydrocarbon liquid is added to increase the mobility of the mixture and the mixture is then washed with an alcohol to remove the decomposed material from the polymer.

4. A process for the production of a crystalline styrene polymer which comprises polymerizing styrene having dissolved therein a styrene soluble copper compound selected from the group consisting of copper naphthenate, copper propionylacetonate and copper hexoylacetonate, by contacting said styrene with a liquid aliphatic hydrocarbon medium containing, as essentially the sole activator of polymerization the reaction product of a lower aluminum trialkyl and vanadium tetrachloride, the tetrachloride being reacted with said lower aluminum trialkyl in a molar ratio which is less than 1.2 to 1.

5. A process according to claim 1 in which said liquid aliphatic hydrocarbon has a boiling point between 80° and 140° C.

6. A process according to claim 1 in which not more than 4 volumes of hydrocarbon liquid are present per volume of liquid monomer.

7. A process according to claim 1 in which at least two volumes of hydrocarbon liquid are present per volume of liquid monomer.

8. A process according to claim 1 in which the molar ratio of liquid monomer to vanadium is less than 50:1.

9. A process according to claim 1 in which the amount of copper compound used provides at least 0.5% copper by weight of the weight of vanadium tetrachloride used.

10. A process according to claim 1 in which a solution of said aluminum trialkyl in hydrocarbon liquid and a solution of said vanadium tetrachloride in hydrocarbon liquid are stirred together and the resulting mixture is then stirred with the liquid monomer which contains said copper compound dissolved therein.

11. A process according to claim 1 in which the polymerization reaction is conducted at a temperature within the range −30° to 70° C.

References Cited in the file of this patent

UNITED STATES PATENTS

| | | |
|---|---|---|
| 2,762,791 | Pease et al. | Sept. 11, 1956 |
| 2,779,751 | Bredereck et al. | Jan. 29, 1957 |
| 2,827,447 | Nowlin et al. | Mar. 18, 1958 |
| 2,871,276 | Eiszner | Jan. 27, 1959 |
| 2,910,461 | Nowlin et al. | Oct. 27, 1959 |
| 2,943,063 | Eby et al. | June 28, 1960 |

FOREIGN PATENTS

| | | |
|---|---|---|
| 538,782 | Belgium | Dec. 6, 1955 |